United States Patent [19]
Maruno

[11] Patent Number: 5,239,893
[45] Date of Patent: Aug. 31, 1993

[54] W-MECHANISM AND RADIAL-PLUNGER-TYPE HYDRAULIC PRESSURE APPARATUS INCORPORATING SUCH W-MECHANISM

[75] Inventor: Fujiya Maruno, Tokyo, Japan

[73] Assignee: Honda Giken Kogyo Kabushiki Kaisha, Tokyo, Japan

[21] Appl. No.: 836,077

[22] Filed: Feb. 13, 1992

[30] Foreign Application Priority Data

Feb. 14, 1991 [JP] Japan .................................. 3-042552

[51] Int. Cl.⁵ ............................................. F16H 35/08
[52] U.S. Cl. ........................................ 74/836; 475/162
[58] Field of Search ................... 74/835, 836; 475/170, 475/162, 176, 177

[56] References Cited

U.S. PATENT DOCUMENTS

| | | | |
|---|---|---|---|
| 1,137,877 | 5/1915 | Manly et al. | 74/836 |
| 1,283,249 | 10/1918 | Manly | 74/835 |
| 2,482,568 | 9/1949 | Werner | 475/176 X |
| 3,146,638 | 9/1964 | Peras | 475/176 X |
| 3,416,495 | 2/1947 | Piazze | 475/170 X |
| 4,679,465 | 7/1987 | Goto et al. | 475/176 X |
| 4,762,025 | 8/1988 | Lew | 475/177 X |
| 5,105,684 | 4/1992 | Imanishi | 74/836 X |

FOREIGN PATENT DOCUMENTS 3-37465 2/1991 Japan .

OTHER PUBLICATIONS

English translation of Abstract of 3-37465.

Primary Examiner—Dirk Wright
Attorney, Agent, or Firm—Lyon & Lyon

[57] ABSTRACT

A radial-plunger-type hydraulic pump or motor includes a W-mechanism comprising a first internal gear relatively rotatably mounted on a main shaft, an external gear rotatably mounted on a supplementary shaft and held in mesh with the first internal gear, and a second internal gear rotatably mounted on an auxiliary shaft and held in mesh with the external gear. The first and second internal gears have the same number of gear teeth, and the supplementary shaft and the auxiliary shaft can revolve around the main shaft. When the auxiliary shaft revolves around the main shaft while the first internal gear is being held against rotation, the second internal gear does not rotate about its own axis, but revolves with the auxiliary shaft around the main shaft. The plungers of the radial-plunger-type pump or motor are allowed to reciprocally move in identical strokes, and no thrust load is applied between the plungers and the cylinders in which the plungers reciprocally move. The W-mechanism, which comprise gears, can operate at high speed with high efficiency, and are of relatively small axial dimensions.

14 Claims, 10 Drawing Sheets

W-MECHANISM AND RADIAL-PLUNGER-TYPE HYDRAULIC PRESSURE APPARATUS INCORPORATING SUCH W-MECHANISM

BACKGROUND OF THE INVENTION

1. Field of the Invention

The present invention relates to a mechanism, hereinafter referred to as a W-mechanism, which includes a main shaft, a first member relatively rotatably mounted, but held against rotation, on the main shaft, an auxiliary shaft revolvable around the main shaft, and a second member rotatably mounted on the auxiliary shaft and revolvable around the first member, but held against rotation about its own axis, or which includes a main shaft, an auxiliary shaft fixed to the main shaft, a first member rotatably mounted on the main shaft, and a second member rotatably mounted on the auxiliary shaft, wherein the second member is rotatable in unison with the first member.

2. Description of the Prior Art

Known W-mechanisms include Oldham couplings and universal joints, for example. One typical apparatus which requires such a W-mechanism to be incorporated therein is a radial-plunger-type pump or motor. A hydraulically operated mechanical unit for use as such a radial-plunger-type pump or motor is disclosed in Japanese Patent Application No. 1-171637, for example, filed by the assignee of the present application. The disclosed unit will be described below with reference to FIG. 12 of the accompanying drawings.

Figure 12:
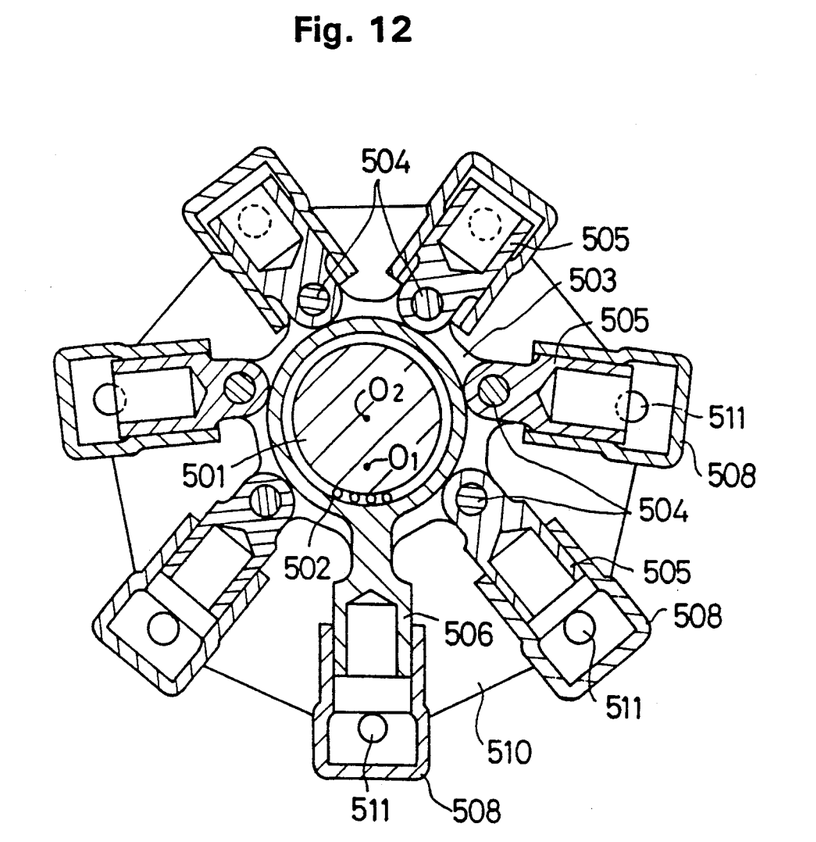
FIG. 12 is a cross-sectional view of a conventional hydraulic pump.

As shown in FIG. 12, the unit comprises a main shaft (not shown) having an axis O1 and an auxiliary shaft 501 that is eccentric with respect to the main shaft and has an axis O2. The auxiliary shaft 501 is integrally coupled to the main shaft. When the main shaft rotates about its own axis O1, the auxiliary shaft 501 revolves around the axis O1. A coupling ring 503 is relatively rotatably mounted on the auxiliary shaft 501 through a bearing 502. To the coupling ring 503, there are connected a plurality of radial rockable plungers 505 through respective coupling pins 504 at circumferentially equal intervals around the axis O2 and a single radial fixed plunger 506 integral with the coupling ring 503. The unit also includes a cylinder casing 510 having an axis aligned with the axis O1 and rotatable about its own axis with respect to the main shaft. A plurality of cylinders 508 are rockably mounted on the cylinder casing 510 through respective supporting pins 511 at circumferentially equal intervals around the axis O1. The plungers 505, 506 are slidably fitted in the respective cylinders 508.

When the unit is to be used as a hydraulic pump, the cylinder casing 510, for example, is held against rotation, and the main shaft is rotated to cause the auxiliary shaft 501 to revolve around the axis O1. The coupling ring 503 also revolves with the auxiliary shaft 501 around the axis O1, causing the plungers 505, 506 to reciprocally move in the respective cylinders 508 for thereby drawing oil into and discharging oil out of the cylinders 508. Since the cylinder casing 510 is held nonrotatable, the coupling ring 503 only revolves around the axis O1, but does not rotate about the axis O2, in order to allow the plunger 505 to reciprocally move in the corresponding cylinder 508. More specifically, the coupling ring 503 and the auxiliary shaft 501 are relatively rotatable through the bearing 502, and the plunger 506 integral with the coupling ring 503 prevents the coupling ring 503 from rotating with respect to the cylinder casing 510.

With the above arrangement, when the main shaft rotates about its axis O1, the coupling ring 503 on the auxiliary shaft 501 revolves around the axis O1 while being prevented from rotating about the axis O2, thereby causing the plungers 505, 506 to reciprocally move in the respective cylinders 508.

Conversely, when oil under pressure is supplied into and discharged out of the cylinders 508, the main shaft is rotated about the axis O1. Therefore, the unit operates as a hydraulic motor.

The unit can also operate as a hydraulic pump or motor with the main shaft held against rotation. In this mode of operation, the cylinder casing 510 is rotated about the axis O1. Inasmuch as the plunger 506 is integral with the coupling ring 503, the rotation of the cylinder casing 510 causes the coupling ring 503 to rotate on the auxiliary shaft 501, which is held against rotation, at the same speed as the cylinder casing 510. The plungers 505, 506 are now caused to reciprocally move in the respective cylinders 508, thereby drawing oil into and discharging oil out of the cylinders 508. Consequently, the cylinder casing 510 and the coupling ring 503 rotate about the respective axes O1, O2 at the same speed, and the plungers 505, 506 reciprocally move in the respective cylinders 508 to draw oil into and discharge oil out of the cylinders 508.

In the radial-plunger-type pump of the above structure, when the coupling ring 503 rotates on the auxiliary shaft 501 with rotation of the cylinder casing 510 to cause the plungers 505, 506 to reciprocally move in the respective cylinders 508, the plunger 506 reciprocally moves with its axis always aligned with a straight line interconnecting the axis O2 and the center of the support pin 511 about which the cylinder 508 is angularly movable. During rotation of the coupling ring 503, the other plungers 505 reciprocally move in the corresponding cylinders 508 while rocking about the respective coupling pins 504, in order to permit the reciprocating movement of the plunger 506 integral with the coupling ring 503. Therefore, the plungers 505, 506 have slightly different strokes of reciprocating movement, and discharge oil at different instantaneous rates. More specifically, while the cylinder casing 510 is making one revolution, the plungers 505, 506 reciprocally move successively in respective strokes thereby to discharge oil under pressure from the respective cylinders 508. Because the plungers 505, 506 discharge oil at different instantaneous rates, the total rate at which the oil is discharged under pressure from the hydraulic pump fluctuates during one revolution of the cylinder casing 510.

Figure 13:
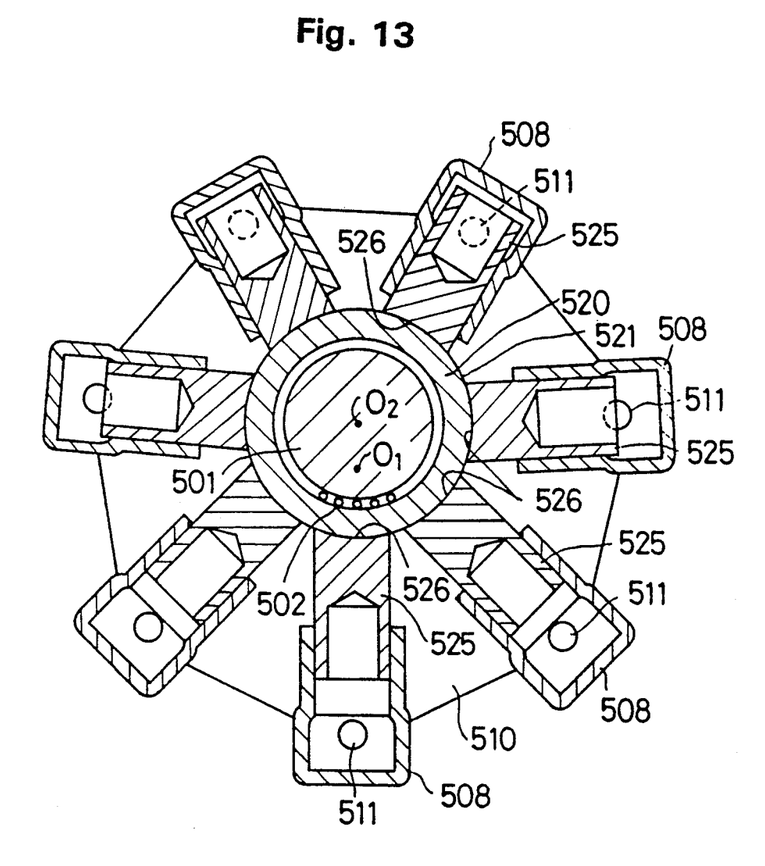
FIG. 13 is a cross-sectional view of another conventional hydraulic pump.

FIG. 13 of the accompanying drawings shows one conventional unit, for use as a pump or a motor, which includes a slide ring 520 mounted on an auxiliary shaft 501, and plungers 525 slidably fitted in respective cylinders 508 and having ends 526 slidably held against an outer circumferential surface 521 of the slide ring 520. In this unit, since the plungers 525 reciprocally move in identical strokes upon rotation of the slide ring 520, the rate at which the oil is discharged under pressure from the unit, operating as a pump, is prevented from fluctuating during one revolution of the casing.

However, the conventional unit shown in FIG. 13 has a problem in that though the plungers 525 can be pushed radially outwardly, i.e., into the respective cylinders 508, by the slide ring 520, but cannot be pulled radially inwardly, i.e., in a direction out of the cylinders 508. Therefore, the unit shown in FIG. 13 is not suitable for use as a hydraulic pump unless the suction side of the pump is pressurized.

One solution is to use a mechanism, referred to as a W-mechanism, which includes a main shaft, a first member relatively rotatably mounted, but held against rotation, on the main shaft, an auxiliary shaft revolvable around the main shaft, and a second member rotatably mounted on the auxiliary shaft and revolvable around the first member, but held against rotation about its own axis, or which includes a main shaft, an auxiliary shaft fixed to the main shaft, a first member rotatably mounted on the main shaft, and a second member rotatably mounted on the auxiliary shaft, wherein the second member is rotatable in unison with the first member, the mechanism being interposed between the main shaft and the auxiliary shaft.

Known W-mechanisms include Oldham couplings and universal joints, for example, as described above. The Oldham couplings have an intermediate member reciprocally movable, causing a slip against the members coupled to the main and auxiliary shafts that are displaced out of coaxial alignment with each other. The greater the distance of eccentricity by which the main and auxiliary shafts are displaced out of coaxial alignment, the greater the slip. Therefore, if the distance of eccentricity is relatively large or the main and auxiliary shafts are required to transmit a high torque or rotate at a high speed, then the various sliding surfaces tend to suffer wear, seizure, and vibration. The universal joints are free from these drawbacks, but require a relatively large axial dimension. As the distance of eccentricity between the main and auxiliary shafts is larger, the axial dimension is also larger, making it difficult to combine the universal joints with radial-plunger-type pumps or motors.

SUMMARY OF THE INVENTION

It is an object of the present invention to provide a W-mechanism which is capable of rotating at high speeds and transmitting high torques.

Another object of the present invention is to provide a W-mechanism which is relatively small in axial dimension and is of a compact arrangement.

Still another object of the present invention is to provide a W-mechanism which can be used in a radial-plunger-type pump or motor, and which has a plurality of plungers that are reciprocally movable in identical strokes.

According to the present invention, there is provided a first W-mechanism comprising a main shaft, a first internal gear relatively rotatably mounted on the main shaft, a supplementary shaft extending parallel to and displaced eccentrically with respect to the main shaft, an external gear rotatably mounted on the supplementary shaft and held in mesh with the first internal gear, an auxiliary shaft extending parallel to and displaced eccentrically with respect to the supplementary shaft, and a second internal gear rotatably mounted on the auxiliary shaft and held in mesh with the external gear, the first and second internal gears having the same number of gear teeth, the supplementary shaft and the auxiliary shaft being revolvable around the main shaft.

According to the present invention, there is also provided a second W-mechanism comprising a main shaft, a first external gear relatively rotatably mounted on the main shaft, a supplementary shaft extending parallel to and displaced eccentrically with respect to the main shaft, an internal gear rotatably mounted on the supplementary shaft and held in mesh with the first external gear, an auxiliary shaft extending parallel to and displaced eccentrically with respect to the supplementary shaft, and a second external gear rotatably mounted on the auxiliary shaft and held in mesh with the internal gear, the first and second external gears having the same number of gear teeth, the supplementary shaft and the auxiliary shaft being revolvable around the main shaft.

In the first and second W-mechanisms, the three gears may have the same number of gear teeth. In the first W-mechanism, the diameter of the gear on the supplementary shaft may be smaller than the diameters of the gears on the main and auxiliary shafts. In the second W-mechanism, the diameter of the gear on the supplementary shaft may be larger than the diameters of the gears on the main and auxiliary shafts. The first and second W-mechanisms may further include interaxial distance varying means for varying the interaxial distance between the main shaft and the auxiliary shaft while keeping constant the interaxial distance between the main shaft and the supplementary shaft and the interaxial distance between the supplementary shaft and the auxiliary shaft.

According to the present invention, there is further provided a third W-mechanism comprising a main shaft, a first sprocket relatively rotatably mounted on the main shaft, an auxiliary shaft extending parallel to and displaced eccentrically with respect to the main shaft, a second sprocket rotatably mounted on the auxiliary shaft, and a chain trained around the first and second sprockets, the first and second sprockets having the same number of teeth, the auxiliary shaft being revolvable around the main shaft.

According to the present invention, there is also provided a fourth W-mechanism comprising a main shaft, a first sprocket relatively rotatably mounted on the main shaft, a supplementary shaft extending parallel to and displaced eccentrically with respect to the main shaft, a second sprocket rotatably mounted on the supplementary shaft, a first chain trained around the first and second sprockets, a third sprocket mounted on the supplementary shaft for rotation in unison with the second sprocket, an auxiliary shaft extending parallel to and displaced eccentrically with respect to the supplementary shaft, a fourth sprocket rotatably mounted on the auxiliary shaft, and a second chain trained around the third and fourth sprockets, the supplementary shaft and the auxiliary shaft being revolvable in unison around the main shaft, the first and fourth sprockets having the same number of teeth, the second and third sprockets having the same number of teeth.

In the fourth W-mechanism, the first, second, third, and fourth sprockets may have the same number of teeth. The fourth W-mechanism may further include interaxial distance varying means for varying the interaxial distance between the main shaft and the auxiliary shaft while keeping constant the interaxial distance between the main shaft and the supplementary shaft and the interaxial distance between the supplementary shaft and the auxiliary shaft.

In the above W-mechanisms, when the auxiliary shaft revolves around the main shaft while the gear or sprocket rotatably mounted on the main shaft is being held against rotation, the gear or sprocket rotatably mounted on the auxiliary shaft does not rotate about its own axis, but revolves with the auxiliary shaft around the main shaft. In the case where the W-mechanism is incorporated in a radial-plunger-type pump or motor, the plungers are allowed to reciprocally move in identical strokes, and no thrust load is applied between the plungers and the cylinders in which the plungers reciprocally move. The W-mechanisms, which comprise gears or a chain or chains and sprockets, can operate at high speed with high efficiency, and are of relatively small axial dimensions.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
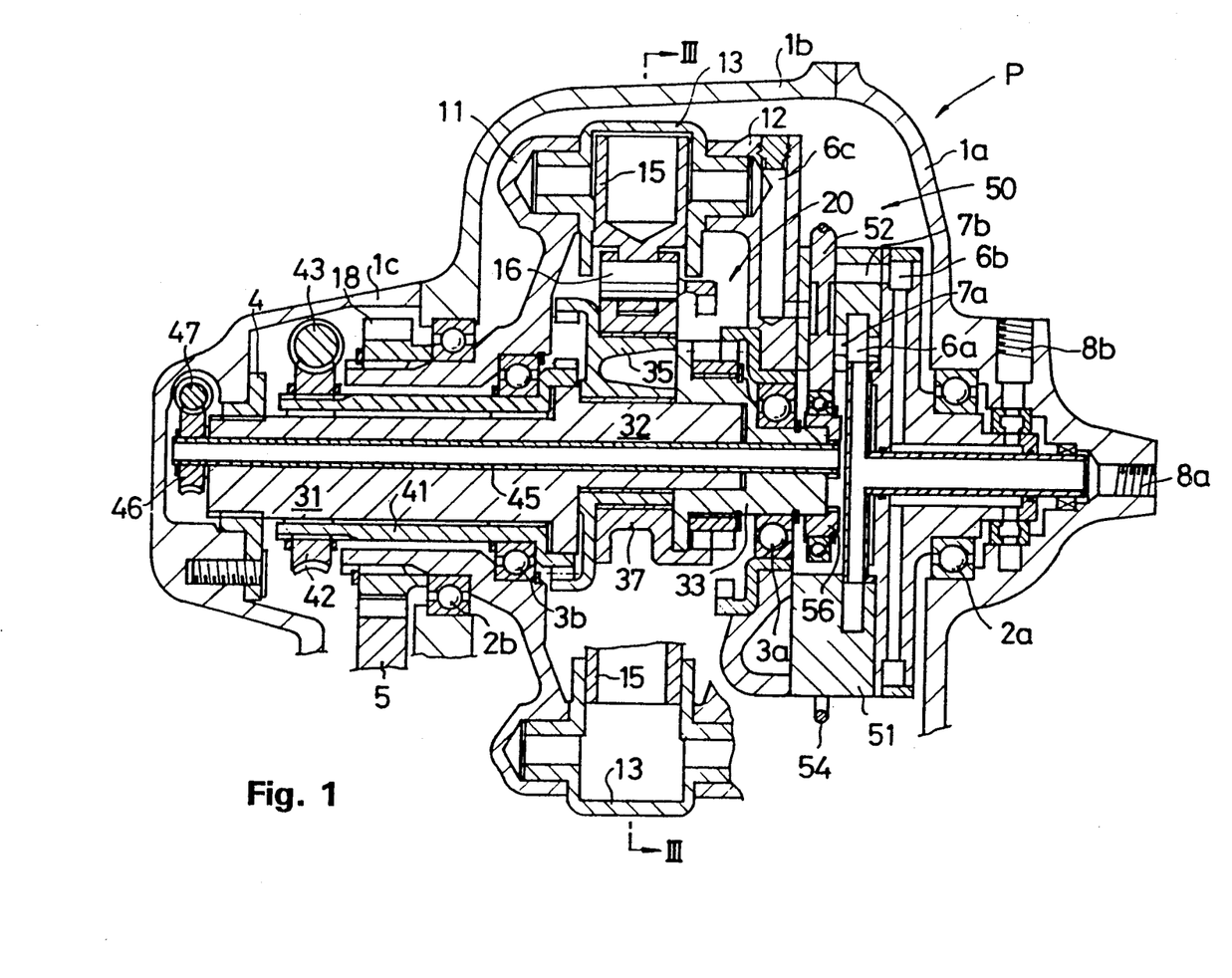
FIG. 1 is a cross-sectional view of a hydraulic pump incorporating a W-mechanism according to the present invention.
Figure 2:
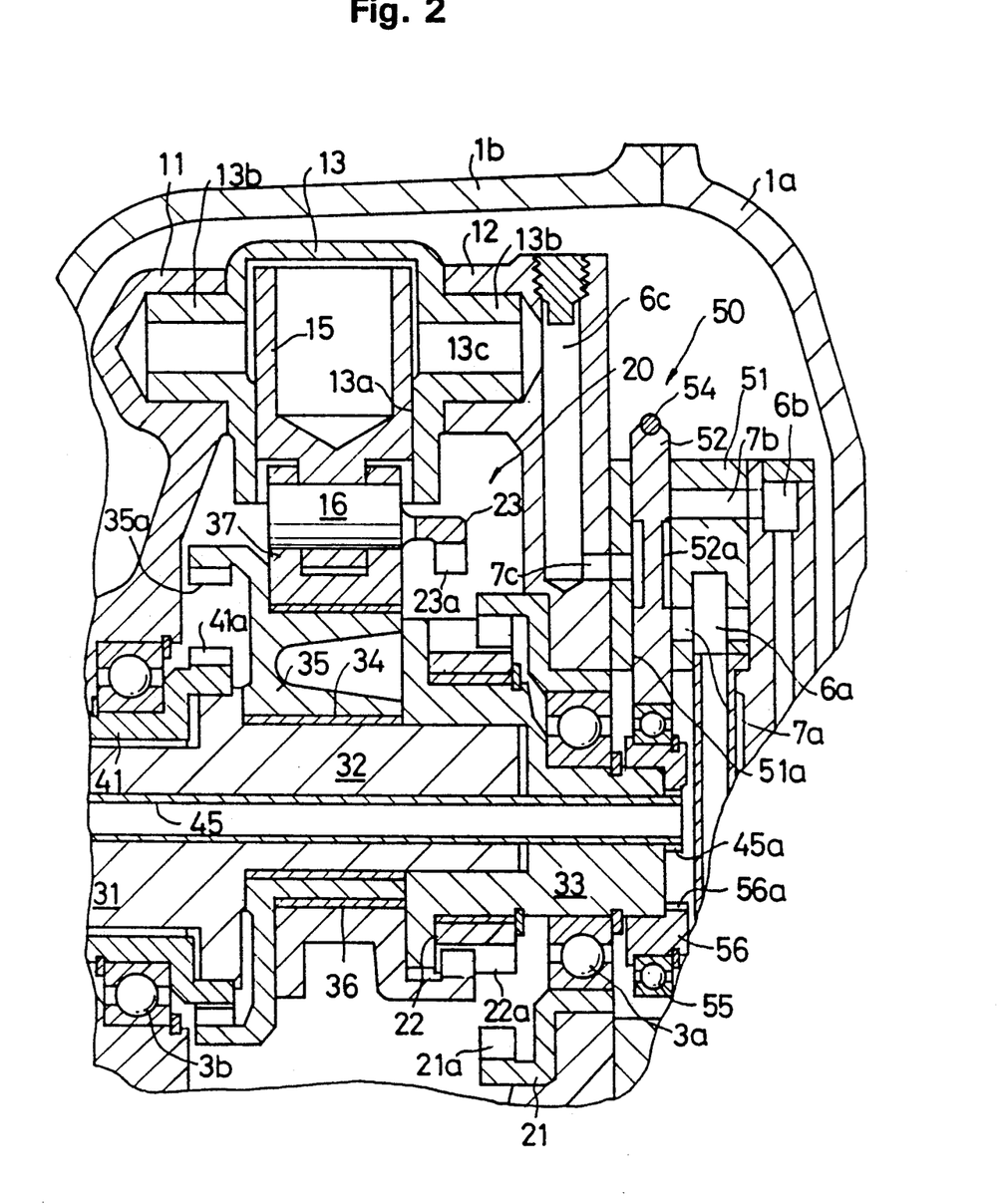
FIG. 2 is an enlarged fragmentary cross-sectional view of a portion of the hydraulic pump shown in FIG. 1.

FIG. 1 shows a hydraulic pump P incorporating a W-mechanism 20 according to the present invention. FIG. 2 fragmentarily shows the hydraulic pump P on enlarged scale. The hydraulic pump P has a housing composed of three housing segments 1a, 1b, 1c that are securely coupled together. Two casings 11, 12, shown on the lefthand and righthand sides in FIG. 1, are rotatably supported in the housing by respective ball bearings 2a, 2b. The casings 11, 12 are fastened to each other by bolts 19 (see FIG. 3).

The hydraulic pump P includes a main shaft 31 extending concentrically through the center of the casings 11, 12 and relatively rotatably supported in the casing 11 by a bearing 3b. That is, the casings 11, 12 are relatively rotatably mounted on the main shaft 31 by the bearing 3b. The main shaft 31 has a lefthand end (as viewed in FIG. 1) splined to a holder 4 fixed to the housing segment 1c. Therefore, the main shaft 31 is held against rotation within the housing. In the illustrated hydraulic pump P, the casings 11, 12 can be rotated about the fixed main shaft 31. The casing 11 has a driven gear 18 fixed thereto at a lefthand end thereof and meshing with a drive gear 5 which can be driven to rotate by an external source. Accordingly, the casings 11, 12 can be rotated about the fixed main shaft 31 by the external source through the drive gear 5 and the driven gear 18.

Figure 4:
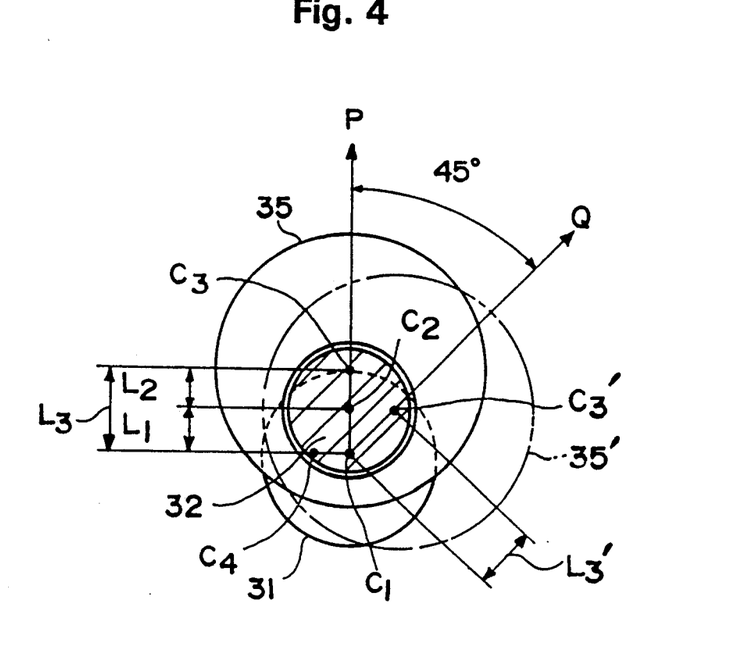
FIG. 4 is a diagram showing the positional relationship between rotational members of the hydraulic pump.

A crankpin 32 is integrally joined to the righthand end of the main shaft 31. As shown in FIG. 4, the crankpin 32 has a central axis C2 radially displaced eccentrically a distance L1 from the central axis C1 of the main shaft 31. The crankpin has its distal end fitted in a shaft support 33 whose central axis is alined with the axis C1. The shaft support 33 relatively rotatably supported in the casing 12 by a bearing 3a. Therefore, the main shaft 31, the crankpin 32, and the shaft support 33 are fixedly held together by the housing.

An eccentric collar 35 is rotatably mounted on the crankpin 32 by a bearing 34, the eccentric collar 35 having a central axis C3 radially displaced eccentrically a distance L2 from the central axis C2 of the crankpin 32. The axis C3 is radially displaced eccentrically a distance L3 from the axis C1. The eccentric collar 35 has an internal gear 35a on its lefthand end.

A sleeve 41 is rotatably mounted on the main shaft 31 and has an external gear 41a on its righthand end which is held in mesh with the internal gear 35a of the eccentric collar 35. A worm gear 42, which is splined to the lefthand end of the sleeve 41, is held in mesh with a worm pinion 43 supported in the housing segment 1c. Normally, the worm pinion 43 is held against rotation, and the sleeve 41 and the eccentric collar 35 are held against rotation on the main shaft 31.

The worm pinion 43 can be rotated by an external source. When the worm pinion 43 is rotated, the sleeve 41 can be rotated with respect to the main shaft 31. The rotation of the sleeve 41 is transmitted through the intermeshing gears 41a, 35a to the eccentric collar 35, which is now angularly moved about the crankpin 32.

FIG. 4 shows the manner in which the axis C3 of the eccentric collar 35 moves when the eccentric collar 35 is angularly moved. In FIG. 4, the eccentric collar 35 is shown as being turned through 90° clockwise with respect to the crankpin 32. Before the eccentric collar 35 is turned, the axis C1 of the main shaft 31, the axis C2 of the crankpin 32, and the axis C3 of the eccentric collar 35 are aligned with each other on a straight line. When the eccentric collar 35 is turned 90° clockwise about the crankpin 32, it reaches an angular position indicated by 35' with its axis indicated by C3'. Therefore, the distance L3' (the radius of revolution of the axis C3' around the axis C1) between the axis C1 and the axis C3' becomes smaller than the distance L3 between the axis C1 and the axis C3 (L3'<L3).

The distance L3 is maximum when the axes C1, C2, C3 are linearly aligned with each other, and minimum when the eccentric collar 35 is turned 180° from the position where the distance L3 is maximum. If the distance L1 is equal to the distance L2, then the distance L3 is zero when the eccentric collar 35 is turned 180° from the position where the distance L3 is maximum.

Figure 3:
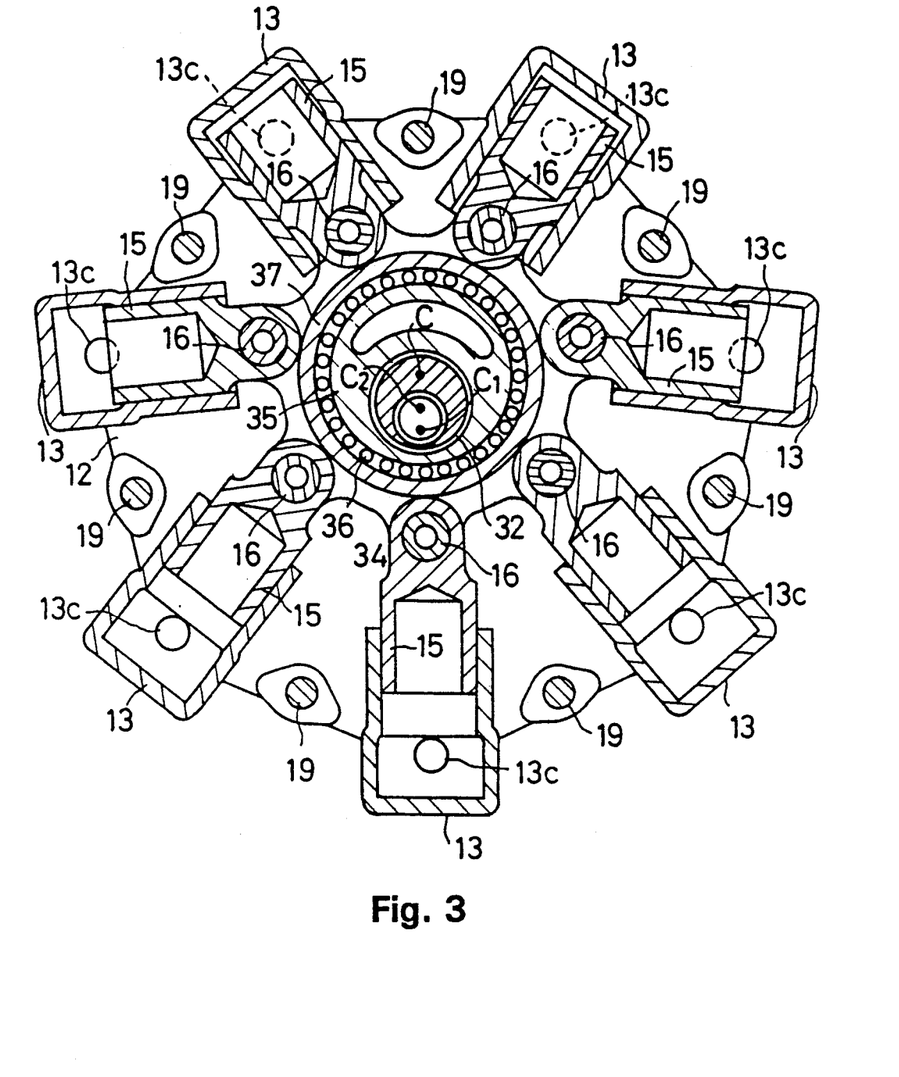
FIG. 3 is a cross-sectional view taken along line III-—III of FIG. 1.

A coupling ring 37 is relatively rotatably mounted on the eccentric collar 35 by a needle bearing 36. Consequently, the coupling ring 37 is rotatable about the axis C3 on the eccentric collar 35. As shown in FIG. 3, seven radial cylinders 13 are disposed around the coupling ring 37. Each of the cylinders 13 has a pair of lefthand and righthand trunnions 13b (see FIG. 2) by which each cylinder 13 is rockably supported on the casings 11, 12.

Each cylinder 13 has a cylinder bore 13a opening radially inwardly. Seven plungers 15 are slidably fitted in the respective cylinder bores 13a from their radially inner ends. The plungers 15 have respective radially inner ends angularly movably coupled to the coupling ring 37 by respective pins 16.

The inner spaces of the cylinder bores 13a are held in communication with a third circuit oil passage 6c defined in the casing 12 through oil holes 13c defined in the righthand trunnions 13b. The third circuit oil passage 6c is joined to a distribution mechanism 50 coupled to the casing 12.

The distribution mechanism 50 has a distribution housing 51 affixed to an axial side of the casing 12. The distribution housing 51 has seven radial insertion holes 51a defined therein at equal circumferential intervals, with distribution spools 52 slidably inserted respectively therein. The distribution spools 52 have radially outer ends held by a holder ring 54 and radially inner ends abutting against an outer circumferential surface of a ball bearing 55 mounted on a distribution cam 56.

The distribution cam 56 is rotatably mounted on an end of the shaft support 33 combined with the main shaft 31, and has an internal gear 56a on its righthand side. The internal gear 56a is held in mesh with an external gear 45a on a righthand end of a drive shaft 45 which extends axially through the main shaft 31, the crankpin 32, and the shaft support 33. To a lefthand end of the drive shaft 45, there is splined a worm gear 46 held in mesh with a worm pinion 47 supported in the housing segment 1c. Normally, the worm pinion 47 is held against rotation, and so is the drive shaft 45. When the worm pinion 47 is driven to rotate by an external source, the drive shaft 45 is rotated to rotate the distribution cam 56.

As shown in FIG. 4, the distribution cam 56 has an outer circumferential surface whose center of curvature C4 is displaced eccentrically from the axis C1 of the shaft support 33, i.e., the axis of the main shaft 31. Therefore, the center of the ball bearing 55 mounted on the outer circumferential surface of the distribution cam 56 is at the eccentrically displaced position C4. When the distribution housing 51 is rotated in unison with the casings 11, 12, the distribution spools 52 with their inner ends held against the outer circumferential surface of the ball bearing 55 are reciprocally moved in the respective holes 51a by a stroke corresponding to the distance by which the center C4 is displaced eccentrically from the axis C1.

The inner circumferential surface of the distribution cam 56 has a center of curvature located at the axis C1. When the worm pinion 47 is rotated to cause the drive shaft 45 to rotate the distribution cam 56, the center C4 of curvature of the outer circumferential surface of the distribution cam 56 revolves around the axis C1. Consequently, rotation of the worm pinion 47 displaces the top and bottom dead centers of the reciprocating movement of the distribution spools 52.

As shown in FIG. 2, the distribution housing 51 has a first communication hole 7a in communication with a first circuit oil passage 6a defined in the distribution housing 51, a second communication hole 7b in communication with a second circuit oil passage 6b defined in the distribution housing 51, and a third communication hole 7c communication with the third circuit oil passage 6c. These first, second, and third communication holes 7a, 7b, 7c are held in communication with the insertion holes 51a. Each of the distribution spools 52 has a spool groove 52a defined therein for allowing the first and third communication holes 7a, 7c to communicate with each other or allowing the second and third communication holes 7b, 7c to communicate with each other depending on the reciprocating movement of the spool 52 in the insertion hole 51a. More specifically, when the distribution spool 52 is moved radially outwardly, the second and third communication holes 7b, 7c are brought into communication with each other by the spool groove 52a. When the distribution spool 52 is moved radially inwardly, the first and third communication holes 7a, 7c are brought into communication with each other by the spool groove 52a. As shown in FIG. 1, the first circuit oil passage 6a communicates with an outlet port 8a defined in the housing segment 1a, and the second circuit oil passage 6b communicates with an inlet port 8b defined in the housing segment 1a.

As the casings 11, 12 are rotated, the distribution mechanism 50 causes the internal spaces of those cylinders 13 which accommodate the plungers 15 in a discharge stroke (compression stroke) to communicate with the outlet port 8a, and also causes the internal spaces of those cylinders 13 which accommodate the plungers 15 in a suction stroke (expansion stroke) to communicate with the inlet port 8b, drawing oil from the inlet port 8b and discharging oil from the outlet port 8a. Therefore, the hydraulic pump P operates to pump the oil.

Figure 5:
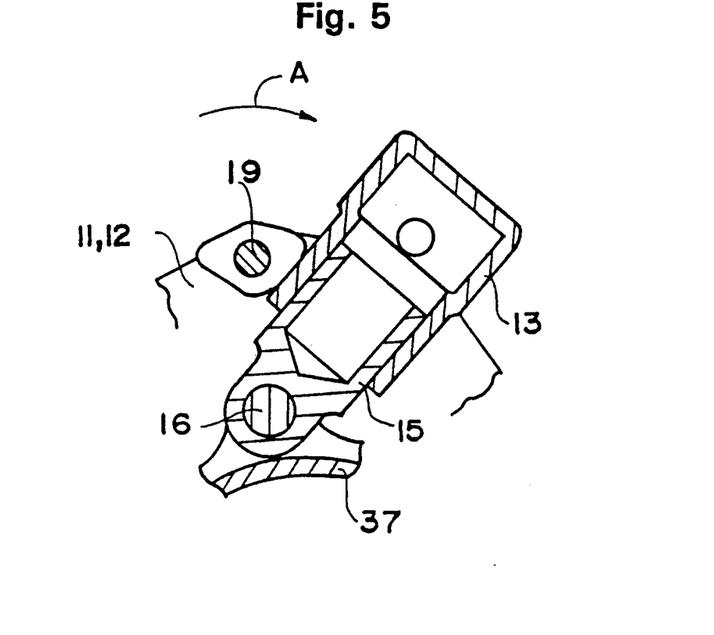
FIG. 5 is a fragmentary cross-sectional view showing relative rotational movement of a casing and a plunger of the hydraulic pump.

The cylinders 13 are rockably coupled to the casings 11, 12, and the plungers 15 are rockably coupled to the coupling ring 37. When the casings 11, 12 are rotated with the cylinders 13 and the plungers 15 being coupled only in such an arrangement, since the coupling ring 37 is rotatable relatively to the casings 11, 12, the coupling ring 37 rotates out of phase with the casings 11, 12 as they rotate, as shown in FIG. 5.

To eliminate such a drawback, the W-mechanism 20 is provided in the hydraulic pump P to rotate the coupling ring 37 in synchronism with the casings 11, 12.

More specifically, as shown in FIG. 2, the double-X mechanism 20 comprises a first internal gear 21 coupled to the casing 12 and having gear teeth 21a concentric with the axis C1 of the main shaft 31, an external gear 22 rotatably mounted on the shaft support 33 and having gear teeth 22a concentric with the axis C2 of the crankpin 32, and a second internal gear 23 integral with the coupling ring 37 and having gear teeth 23a concentric with the axis C3 of the outer circumferential surface of the eccentric collar 35, i.e., the axis of the coupling ring 37. It is assumed that the W-mechanism 20 includes a main shaft whose central axis is aligned with the axis C1, a supplementary shaft whose central axis is aligned with the axis C2, and an auxiliary shaft whose central axis is aligned with the axis C3.

The first internal gear 21, the second internal gear 23, and the external gear 22 have the same number of gear teeth. The gear teeth 21a, 23a of the first and second internal gears 21, 23 have profiles shifted with positive shifting coefficients, and relatively large pitch circle diameters. The gear teeth 22a of the external gear 22 have a profile shifted with a negative shifting coefficient, and a relatively small pitch circle diameter. That is, the diameter of the external gear 22 is smaller than the diameters of the first and second internal gears 21, 23. The first internal gear 21 and the external gear 22 are held in mesh with each other, and the external gear 22 and the second internal gear 23 are held in mesh with each other.

Figure 6:
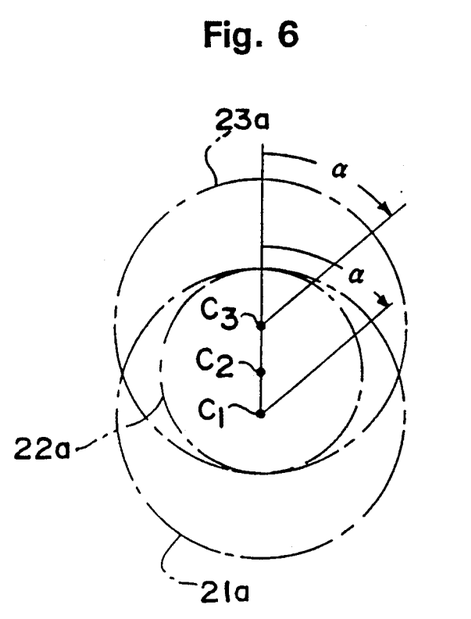
FIG. 6 is a schematic diagram illustrative of a mode of operation of the W-mechanism.

A mode of operation of the W-mechanism 20 will be described below with reference to FIG. 6.

In the hydraulic pump P, the casings 11, 12 rotate on the main shaft 31 about the axis C1. Now, the first internal gear 21 coupled to the casings 11, 12 is angularly moved through an angle $\alpha$ as shown in FIG. 6. Inasmuch as the first and second internal gears 21, 23 have the same number of gear teeth, the second internal gear 23 is also angularly moved through the angle $\alpha$ about the auxiliary shaft which has the axis C3. Therefore, when the casings 11, 12 are rotated on the main shaft 31, the double-X mechanism 20 causes the coupling ring 37 to rotate the coupling ring 37 at the same speed as the casings 11, 12. The plungers 15 are therefore caused to reciprocally move in identical strokes, so that the hydraulic pump P discharges oil at a rate that is subjected to small fluctuations.

In the hydraulic pump P which operates in the above mode, the main shaft 31 is held against rotation, and the casings 11, 12 are rotated on the main shaft 31. However, the casings 11, 12 may be held against rotation, and the main shaft 31 may be driven to rotate for operating the hydraulic pump P. In such a mode of operation, the W-mechanism 20 causes the coupling ring 37 to revolve around the main shaft 31 while preventing the coupling ring 37 from rotating about its own axis C3, in response to rotation of the main shaft 31.

Figure 7:
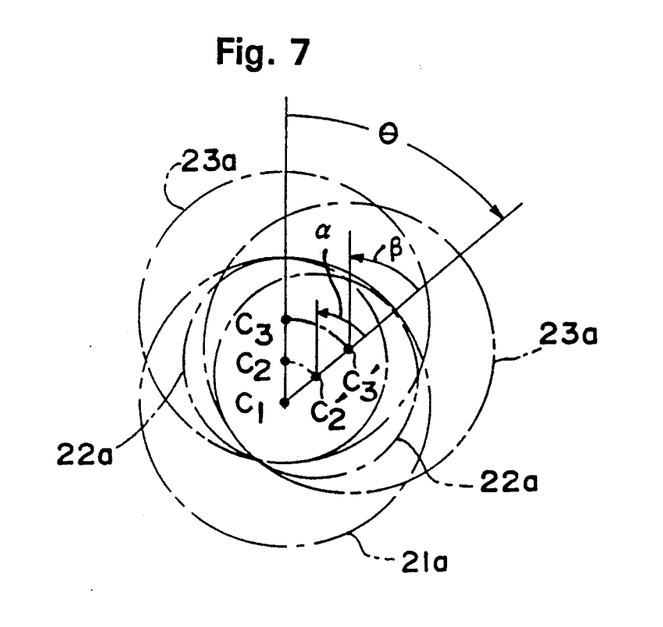
FIG. 7 is a schematic diagram illustrative of another mode of operation of the W-mechanism.

The above mode of operation will be described below with reference to FIG. 7.

Since the eccentric collar 35 is connected to the main shaft 31, when the main shaft 31 rotates, the axis of the crankpin 32 (the axis of the supplementary shaft), i.e., the axis C2 of the external gear 22, and the axis of the outer circumferential surface of the eccentric collar 35 (the axis of the auxiliary shaft), i.e., the axis C3 of the second internal gear 23, revolve around the axis C1 of the main shaft 31. If the main shaft 31 is angularly moved through an angle $\theta$, for example, as shown in FIG. 7, the axes C2, C3 revolve through the angle $\theta$ around the axis C1.

Because the first internal gear 21 is secured to the casings 11, 12, when the axis C2 of the external gear 22 is turned through the angle $\theta$, the external gear 22 is angularly moved backwards through an angle $\alpha$. The number of gear teeth of the gears 21, 22 and their angular displacement are inversely proportional to each other. Thus, the angle $\alpha$ is given as follows:

$$\alpha = -Z1/Z2 \times \theta \quad (1)$$

where Z1 and Z2 are the numbers of gear teeth of the first internal gear 21 and the external gear 22, respectively.

When the external gear 22 is turned through the angle $\alpha$, the second internal gear 23 is angularly moved through an angle $\beta$ that is expressed, using the equation (1) above, by:

$$\beta = Z2/Z3 \times \alpha = -Z1/Z3 \times \theta \quad (2)$$

where Z3 is the number of gear teeth of the second internal gear 23.

The rotational angle $\delta$ (absolute rotational angle) of the second internal gear 23 with respect to the first internal gear 21 is the sum of the angle $\theta$ through which the axis C2 revolves around the axis C1 and the angle $\alpha$ through which the external gear 22 rotates through the angle $\alpha$. Therefore, the rotational angle $\delta$ is given by:

$$\delta = \theta + \alpha = (Z3 - Z1)/Z3 \times \theta \quad (3).$$

The equation (3) indicates that if the numbers Z1, Z3 of gear teeth of the first and second internal gears 21, 23 are equal to each other, then the rotational angle $\delta$ of the second internal gear 23 is zero, and the second internal gear 23 does not rotate about its own axis.

As can be seen from the above mode of operation, when the casings 11, 12 are held against rotation and the main shaft 31 is driven to rotate, the W-mechanism 20 operates to cause the coupling ring 37 to revolve around the main shaft 31 while preventing the coupling ring 37 from rotating about its own axis upon rotation of the main shaft 31. Since the casings 11, 12 are secured against rotation, the plungers 15 reciprocally move in the same stroke in the respective cylinders 13 held by the casings 11, 12.

Insofar as the first and second internal gears 21, 23 have the same number of gear teeth in the above double-X mechanism 20, the coupling ring 37 may be rotated synchronously with the casings 11, 12 with the main shaft 31 held against rotation, or the coupling ring 37 may be caused to revolve around the main shaft 31 while being prevented from rotating about its own axis in synchronism with the main shaft 31 with the casings 11, 12 held against rotation. In such a case, the number of gear teeth of the external gear 22 is immaterial. However, if the number Z2 of gear teeth of the external gear 22 is different from the numbers Z1, Z3 of gear teeth of the internal gears 21, 23, then when the worm pinion 43 is rotated to change the position of the axis C3 to vary the distance L3 (i.e., to modify the hydraulic pump P such that it is of the variable-displacement type), the plungers 15 coupled to the coupling ring 37 tend to be shifted out of phase with the cylinders 13 mounted on the casings 11, 12. To avoid this shortcoming, the hydraulic pump P according to the present invention is arranged such that the internal gears 21, 23 are formed with a positive profile shift and the external gear 22 with a negative profile shift, and the gears 21, 22, 23 have the same number of gear teeth.

Figure 8:
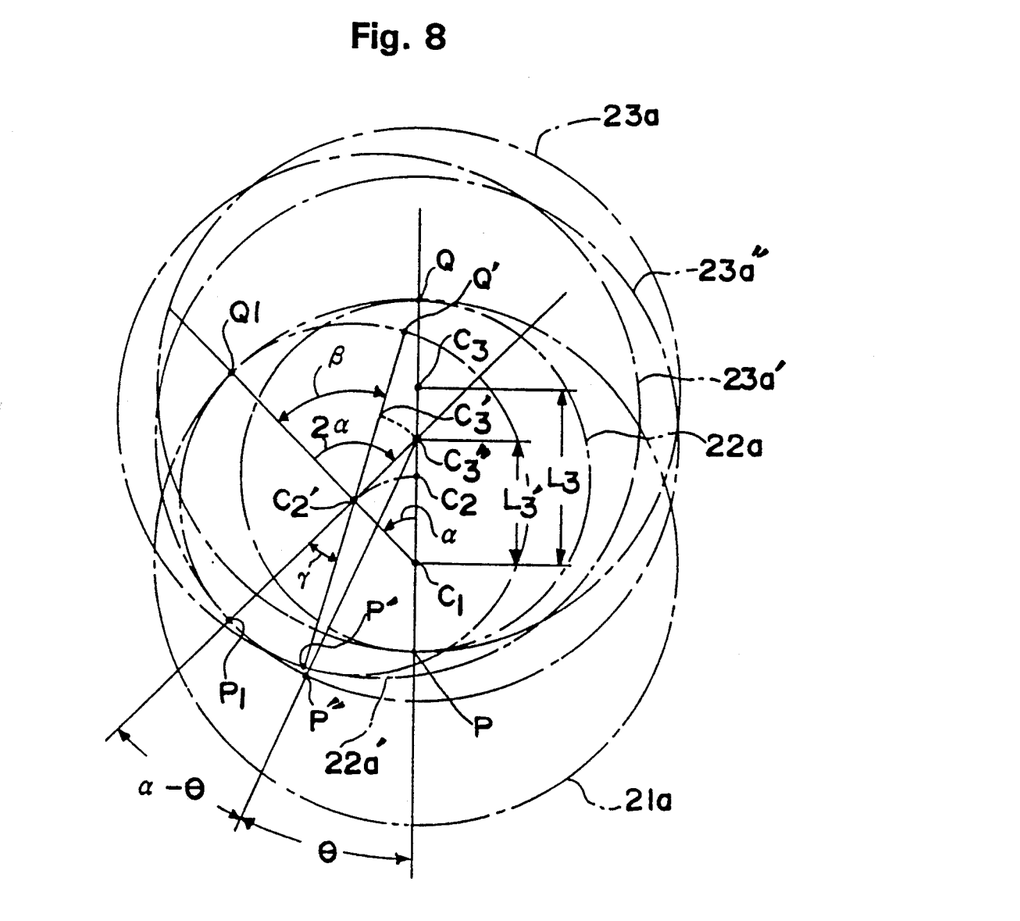
FIG. 8 is a schematic diagram illustrative of axial distance adjustment in the W-mechanism.

The reason for equalizing the numbers of gear teeth of the gears 21, 22, 23 will be described below with reference to FIG. 8.

It is assumed that the casings 11, 12 are held against rotation and the phase of the cylinders 13 mounted on the casings 11, 12, which remains unchanged, is regarded as a reference. The worm pinion 43 is rotated to turn the axis C3 through an angle 2$\alpha$ with respect to the axis C2. When the axis C2 is turned backward through an angle $\alpha$ about the axis C1, the axis C3 moves to a position C3'', and the stroke of the plungers 13 varies from L3 to L3'. The interaxial distances L1, L2 shown in FIG. 4 are equal to each other (L1=L2). The rotational angle $\theta$ of the second internal gear 23, i.e., the coupling ring 37, at this time is determined as follows:

First, when the axis C2 of the external gear 22 moves to a position C2' through the angle $\alpha$ while being held in mesh with the first internal gear 21 coupled to the casings 11, 12, a point Q where the gears 21, 22 mesh with each other moves. At this time, the axis C2 of the external gear 22 moves to a position indicated by C2', and the meshing point Q moves to a position indicated by Q1. The angle $\beta$ through which the external gear 22 is angularly moved is an angle subtended by an arc between a point Q' corresponding to the original meshing point and the meshing point Q1. Since the length of the arc Q'Q1 is equal to the length of the arc QQ1, the relationship $Z1 \times \alpha = Z2 \times \beta$ is satisfied, and the angle $\beta$ is given by:

$$\beta = Z1/Z2 \times \alpha \qquad (4)$$

At this time, the axis C3 has moved to a position indicated by C3', and a point P where the external gear 22 and the second internal gear 23 mesh with each other has moved to a point indicated by P'.

Then, the second internal gear 23 is turned about the axis C2', with its axis C3' moving to a position indicated by C3'', whereupon the process of reducing the interaxial distance L3 to L3' is completed. The point P' where the external gear 22 and the second internal gear 23 mesh with each other moves to a point P1. A point corresponding to the meshing point P' moves to a point P''. Because the first meshing point P on the second internal gear 23 where it meshes with the external gear 22 moves eventually to the point P'', the angle through which the phase of the second internal gear 23 varies is represented by an angle $\theta$ about the axis C3'' from the point P to the point P''.

At this time, the distance over which the external gear 22 is turned, i.e., an arc P'P1, is equal to the distance over which the second internal gear 23 is turned, i.e., an arc P''P1. Since the angle through which the external gear 22 is turned is $\gamma$ ($=2\alpha - \beta$) and the angle through which the second internal gear 23 is turned is $(\alpha - \theta)$, the following equation is satisfied:

$$Z2(2\alpha - \beta) = Z3(\alpha - \theta) \qquad (5)$$

Substituting the equation (4) and the relationship $Z1 = Z3$ in the equation (5), the following equation is obtained:

$$\theta = (Z1 - Z2)/Z1 \times 2\alpha \qquad (6)$$

The equation (6) indicates the relationship between the rotational angle $\theta$ (the angle through which the phase varies) of the second internal gear 23 and the rotational angle $\alpha$ of the axis C2 of the external gear 22 for interaxial adjustment. It can be seen from the equation (6) that if $Z1 = Z2 = Z3$, then the rotational angle $\theta$ of the second internal gear 23 is zero ($\theta = 0$), and the phase of the second internal gear 23 remains unchanged even when the interaxial distance is adjusted.

Figure 9:
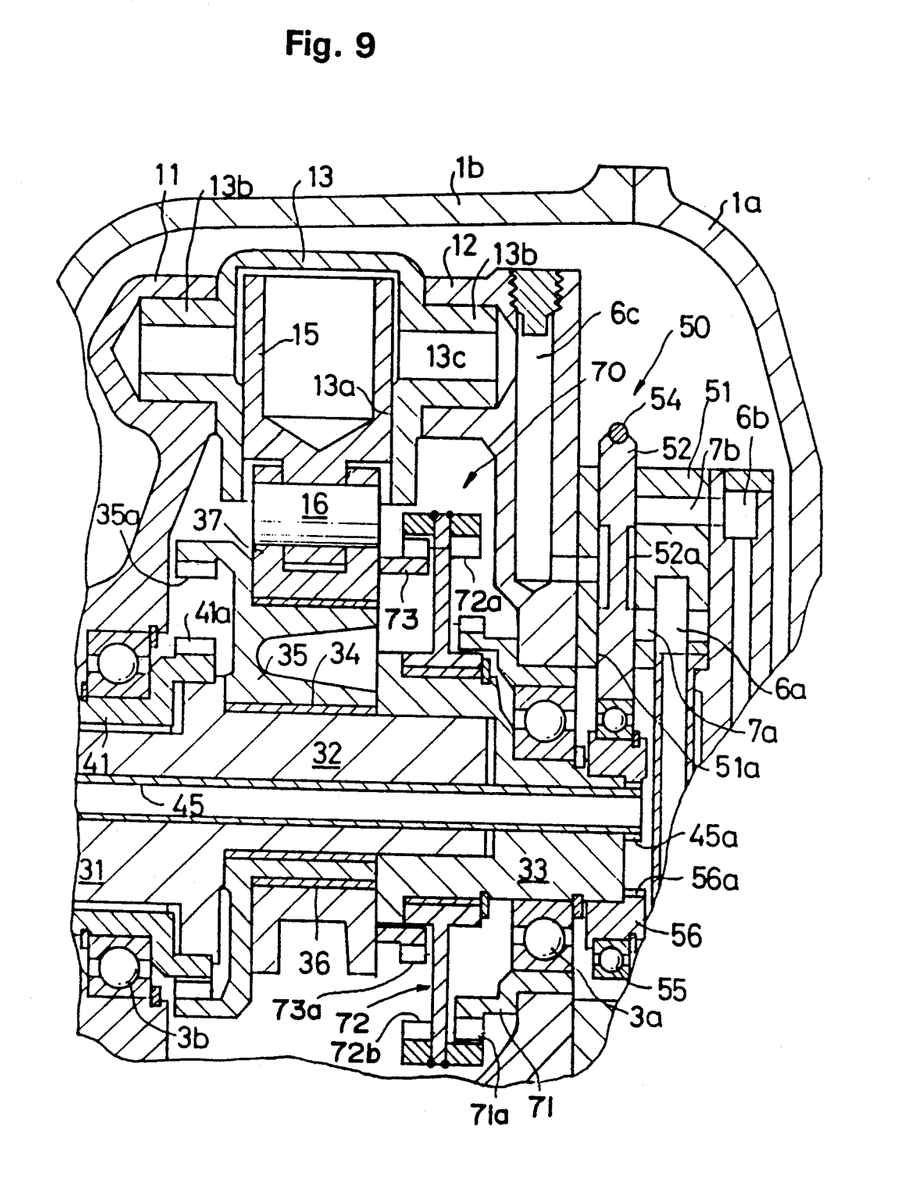
FIG. 9 is a cross-sectional view of a hydraulic pump incorporating a W-mechanism according to another embodiment of the present invention.

In the above embodiment, the W-mechanism 20 is composed of the first internal gear 21, the second internal gear 23, and the single external gear 22. However, as shown in FIG. 9, a W-mechanism may comprise a first external gear 71 coupled to the casing 12 and having gear teeth 71a concentric with the axis C1 of the main shaft 31, an internal gear 72 rotatably mounted on the shaft support 33 and having gear teeth 72a, 72b (which are of identical structural details, concentric with each other, and integrally joined to each other) concentric with the axis C2 of the crankpin 32, and a second external gear 73 integral with the coupling ring 37 and having gear teeth 73a concentric with the axis C3 of the outer circumferential surface of the eccentric collar 35, i.e., the axis of the coupling ring 37. It is assumed that the W-mechanism 70 includes a main shaft whose central axis is aligned with the axis C1, a supplementary shaft whose central axis is aligned with the axis C2, and an auxiliary shaft whose central axis is aligned with the axis C3.

The first external gear 71, the second external gear 73, and the internal gear 72 have the same number of gear teeth. The gear teeth 71a, 73a of the first and second external gears 71, 73 have profiles shifted with negative shifting coefficients, and relatively small pitch circle diameters. The gear teeth 72a of the internal gear 72 have a profile shifted with a positive shifting coefficient, and a relatively large pitch circle diameter. That is, the diameter of the internal gear 72 is larger than the diameters of the first and second external gears 71, 73. The first external gear 71 and the internal gear 72 are held in mesh with each other, and the internal gear 72 and the second external gear 73 are held in mesh with each other.

The W-mechanism 70 operates in the same manner as the W-mechanism 20.

In each of the above embodiments, the W-mechanism comprises a combination of gears. However, a W-mechanism may be in the form of a combination of a chain or chains and sprockets, as shown in FIGS. 10 and 11.

Figure 10:
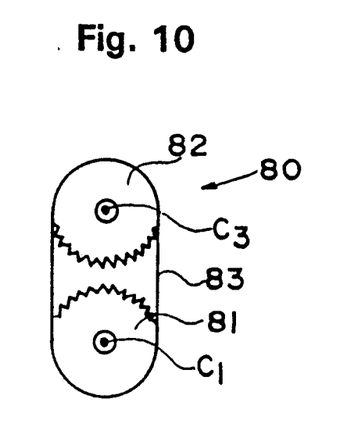
FIG. 10 is a view of a W-mechanism according to still another embodiment of the present invention.

FIG. 10 shows a W-mechanism 80 comprising a first sprocket 81 rotatably mounted on a main shaft C1, a second sprocket 82 rotatably mounted on an auxiliary shaft C3, and a chain 83 trained around the sprockets 81, 82. The sprockets 81, 82 have the same number of teeth. The W-mechanism 80 does not have any supplementary shaft and cannot variably adjust the distance between the main shaft C1 and the auxiliary shaft C3. However, the W-mechanism 80 operates in the same manner as the W-mechanisms 20, 70.

Figure 11:
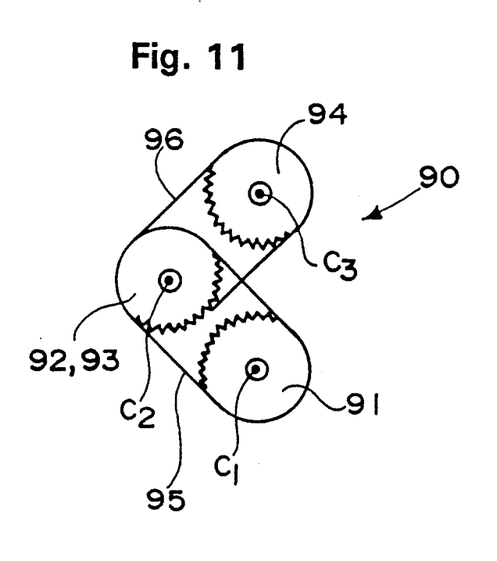
FIG. 11 is a view of a W-mechanism according to yet still another embodiment of the present invention.

FIG. 11 shows a W-mechanism 90 comprising a first sprocket 91 rotatably mounted on a main shaft C1, a second sprocket 92 rotatably mounted on a supplementary shaft C2, a first chain 95 trained around the sprockets 91, 92, a third sprocket 93 coupled to the second sprocket 92 in juxtaposed relationship thereto, a fourth sprocket 94 rotatably mounted on an auxiliary shaft C3, and a second chain trained around the sprockets 93, 94. The distance between the main shaft C1 and the auxiliary shaft C3 can varied by varying the position of the supplementary shaft C2 while keeping constant the distance between the main shaft C1 and the supplementary shaft C2 and the distance between the supplementary shaft C2 and the auxiliary shaft C3. All the sprockets 91, 92, 93 have the same number of teeth.

Although certain preferred embodiments of the present invention have been shown and described in detail, it should be understood that various changes and modifications may be made therein without departing from the scope of the appended claims.

What is claimed is:

1. A W-mechanism comprising:

a main shaft;

a first internal gear being coaxial and relatively rotatably mounted on said main shaft;

a supplementary shaft extending parallel to and displaced eccentrically with respect to said main shaft;

an external gear rotatably mounted on said supplementary shaft and held in mesh with said first internal gear;

an auxiliary shaft extending parallel to and displaced eccentrically with respect to said supplementary shaft; and a second internal gear rotatably mounted on said auxiliary shaft and held in mesh with said external gear;

said first and second internal gears having the same number of gear teeth, and said auxiliary shaft being revolvable around said main shaft.

2. A W-mechanism according to claim 1, wherein said external gear has the same number of gear teeth as the number of gear teeth of said first and second internal gears, said external gear and said first and second internal gears having gear teeth shifted in profile such that said external gear has a diameter smaller than the diameter of said first and second internal gears.

3. A W-mechanism according to claim 1 or 2, further including interaxial distance varying means for varying the interaxial distance between said main shaft and said auxiliary shaft while keeping constant the interaxial distance between said main shaft and said supplementary shaft and the interaxial distance between said supplementary shaft and said auxiliary shaft.

4. A W-mechanism according to claim 1, further including:
a casing;
said main shaft rotatably supported in said casing, said main shaft having a first central axis;
said supplementary shaft comprising a crankpin integral eccentrically with said main shaft, said crankpin having a second central axis;
said auxiliary shaft comprising an eccentric collar rotatably mounted on said crankpin;
means for holding said eccentric collar against angular movement with respect to said crankpin;
a coupling ring rotatably mounted on said eccentric collar, said coupling ring having a third central axis;
a plurality of cylinders rockably mounted on said casing radially with respect to said main shaft in surrounding relationship to said coupling ring;
a plurality of plungers slidably inserted respectively in said cylinders through radially inner ends thereof, said plungers having radially inner ends angularly movably coupled to said coupling ring; and
wherein said first internal gear is coupled to said casing and has gear teeth concentric with said first central axis, said external gear is mounted on said crankpin for rotation about said second central axis and has gear teeth concentric with said second central axis, and said seconds internal gear is integral with said coupling ring and has gear teeth concentric with said third central axis.

5. A W-mechanism according to claim 4, further including a housing, said casing being disposed in said housing, said main shaft being fixedly mounted in said housing.

6. A W-mechanism comprising:
a main shaft;
a first external gear being coaxial with and relatively rotatably mounted on said main shaft;
a supplementary shaft extending parallel to and displaced eccentrically with respect to said main shaft;
an internal gear rotatably mounted on said supplementary shaft and held in mesh with said first external gear;

an auxiliary shaft extending parallel to and displaced eccentrically with respect to; and a second external gear rotatably mounted on said auxiliary shaft and held in mesh with said internal gear;

said first and second external gears having the same number of gear teeth, said supplementary shaft and said auxiliary shaft being revolvable around said main shaft.

7. A W-mechanism according to claim 6, wherein said internal gear has the same number of gear teeth as the number of gear teeth of said first and second external gears, said internal gear and said first and second external gears having gear teeth shifted in profile such that said internal gear has a diameter larger than the diameter of said first and second external gears.

8. A W-mechanism according to claim 6 or 7, further including interaxial distance varying means for varying the interaxial distance between said main shaft and said auxiliary shaft while keeping constant the interaxial distance between said main shaft and said supplementary shaft and the interaxial distance between said supplementary shaft and said auxiliary shaft.

9. A W-mechanism according to claim 6, further including:
a casing;
said main shaft rotatably supported in said casing, said main shaft having a first central axis;
said supplementary shaft comprising a crankpin integral eccentrically with said main shaft, said crankpin having a second central axis;
said auxiliary shaft comprising an eccentric collar rotatably mounted on said crankpin;
means for holding said eccentric collar against angular movement with respect to said crankpin;
a coupling ring rotatably mounted on said eccentric collar, said coupling ring having a third central axis;
a plurality of cylinders rockably mounted on said casing radially with respect to said main shaft in surrounding relationship to said coupling ring;
a plurality of plungers slidably inserted respectively in said cylinders through radially inner ends thereof, said plungers having radially inner ends angularly movably coupled to said coupling ring; and
wherein said first external gear is coupled to said casing and has gear teeth concentric with said first central axis, said internal gear is mounted on said crankpin for rotation about said second central axis and has gear teeth concentric with said second central axis, and said second external gear is integral with said coupling ring and has gear teeth concentric with said third central axis.

10. A W-mechanism according to claim 9, further including a housing, said casing being disposed in said housing, said main shaft being fixedly mounted in said housing.

11. A radial-plunger-type hydraulic pressure apparatus comprising:
a casing;
a main shaft rotatably supported in said casing, said main shaft having a first central axis;
a crankpin integral eccentrically with said main shaft, said crankpin having a second central axis;
an eccentric collar rotatably mounted on said crankpin;

means for holding said eccentric collar against angular movement with respect to said crankpin;
a coupling ring rotatably mounted on said eccentric collar, said coupling ring having a third central axis;
a plurality of cylinders rockably mounted on said casing radially with respect to said main shaft in surrounding relationship to said coupling ring;
a plurality of plungers slidably inserted respectively in said cylinders through radially inner ends thereof, said plungers having radially inner ends angularly movably coupled to said coupling ring; and
a W-mechanism comprising a first internal gear coupled to said casing and having gear teeth concentric with said first central axis, an external gear mounted on said main shaft for rotation about said second central axis and having gear teeth concentric with said second central axis, and a second internal gear integral with said coupling ring and having gear teeth concentric with said third central axis, said external gear being held in mesh with said first and second internal gears, said first and second internal gears having the same number of gear teeth.

12. A radial-plunger-type hydraulic pressure apparatus according to claim 11, further including a housing, said casing being disposed in said housing, said main shaft being fixedly mounted in said housing.

13. A radial-plunger-type hydraulic pressure apparatus comprising:
a casing;
a main shaft rotatably supported in said casing, said main shaft having a first central axis;
a crankpin integral eccentrically with said main shaft, said crankpin having a second central axis;
an eccentric collar rotatably mounted on said crankpin;
means for holding said eccentric collar against angular movement with respect to said crankpin;
a coupling ring rotatably mounted on said eccentric collar, said coupling ring having a third central axis;
a plurality of cylinders rockably mounted on said casing radially with respect to said main shaft in surrounding relationship to said coupling ring;
a plurality of plungers slidably inserted respectively in said cylinders through radially inner ends thereof, said plungers having radially inner ends angularly movably coupled to said coupling ring; and
a W-mechanism comprising a first external gear coupled to said casing and having gear teeth concentric with said first central axis, an internal gear mounted on said main shaft for rotation about said second central axis and having gear teeth concentric with said second central axis, and a second external gear integral with said coupling ring and having gear teeth concentric with said third central axis, said internal gear being held in mesh with said first and second external gears, said first and second external gears having the same number of gear teeth.

14. A radial-plunger-type hydraulic pressure apparatus according to claim 13, further including a housing, said casing being disposed in said housing, said main shaft being fixedly mounted in said housing.

* * * * *